(12) United States Patent
Tollefson et al.

(10) Patent No.: US 11,597,445 B2
(45) Date of Patent: Mar. 7, 2023

(54) FENDER MOUNTING ACCESSORIES

(71) Applicants: Paul M. Tollefson, Blooming Prairie, MN (US); David D. Easton, Blooming Prairie, MN (US); Lyndon D. Johnson, Blooming Prairie, MN (US)

(72) Inventors: Paul M. Tollefson, Blooming Prairie, MN (US); David D. Easton, Blooming Prairie, MN (US); Lyndon D. Johnson, Blooming Prairie, MN (US)

(73) Assignee: Pinnacle Heavy Duty, LLC, Blooming Prairie, MN (US)

( * ) Notice: Subject to any disclaimer, the term of this patent is extended or adjusted under 35 U.S.C. 154(b) by 540 days.

(21) Appl. No.: 16/833,862

(22) Filed: Mar. 30, 2020

(65) Prior Publication Data

US 2020/0307714 A1 Oct. 1, 2020

Related U.S. Application Data

(60) Provisional application No. 62/827,695, filed on Apr. 1, 2019.

(51) Int. Cl.
*B62D 25/16* (2006.01)

(52) U.S. Cl.
CPC ................. *B62D 25/166* (2013.01)

(58) Field of Classification Search
CPC .............................. B62D 25/166; B62D 25/16
USPC .......................................................... 280/854
See application file for complete search history.

(56) References Cited

U.S. PATENT DOCUMENTS

| 4,148,373 | A | | 4/1979 | Cline | |
|---|---|---|---|---|---|
| 5,301,999 | A | | 4/1994 | Thompson et al. | |
| 5,950,975 | A | | 9/1999 | Zieske | |
| 6,076,842 | A | * | 6/2000 | Knoer | B62D 25/188 224/42.31 |
| 6,471,228 | B2 | | 10/2002 | Hawes | |
| 7,207,617 | B2 | * | 4/2007 | Pelini | B62D 27/065 296/203.02 |
| 2002/0020983 | A1 | * | 2/2002 | Hawes | B62D 25/168 280/154 |
| 2005/0062278 | A1 | * | 3/2005 | Griffin | B62J 15/02 280/847 |
| 2017/0029032 | A1 | * | 2/2017 | Hammer | B60R 21/34 |
| 2017/0050597 | A1 | * | 2/2017 | Hammer | B60R 19/34 |

OTHER PUBLICATIONS

Bettshd, "Single, Half Tandem and Full Tandem Fender and Bracket Installation Instructions", Aug. 26, 2015, 2 pages, BettsCompany, Fresno, CA.

* cited by examiner

*Primary Examiner* — John D Walters
*Assistant Examiner* — Hilary L Johns
(74) *Attorney, Agent, or Firm* — Brooks, Cameron & Huebsch, PLLC (57) ABSTRACT

Fender mounting accessories are described herein. Fender mounting accessories can include a fender bracket and a fender attachment mechanism. A fender bracket can include a fender bracket and an extension member including an offset mounting flange for coupling with a fender attachment mechanism. A fender attachment mechanism can include an inner flange for coupling to the fender bracket and attachment locations for coupling to a fender.

20 Claims, 10 Drawing Sheets

FENDER MOUNTING ACCESSORIES

PRIORITY INFORMATION

This application claims priority to U.S. Provisional Application 62/827,695, filed on Apr. 1, 2019, the contents of which are incorporated by reference.

TECHNICAL FIELD

The present disclosure relates to fender mounting accessories, including fender brackets and fender attachment mechanisms

BACKGROUND

A fender can be an important part on a vehicle. A vehicle can be, for example, a machine that transports people, cargo, etc. A vehicle may be, for instance, a self-propelled conveyance moving on wheels. For example, a vehicle may include an automobile such as a car, truck, etc.

A vehicle can include a fender. As used herein, the term "fender" refers to a portion of a vehicle that frames a wheel or a set of wheels. A fender on a vehicle can serve a variety of purposes. For instance, a fender may serve an aesthetic purpose. For example, a fender may be styled, shaped, painted, etc. in order to exude a particular outward appearance that may be pleasing to view.

As another example, a fender may serve a utilitarian purpose. For example, wheels on a vehicle in motion may cause debris such as sand, mud, rocks, liquids, and/or other debris to be thrown into the air by the rotation of the wheels of the vehicle in motion. A fender can prevent the debris from being thrown into the air. A fender can be located proximate to a wheel and/or a set of wheels to act as a barrier such that debris thrown into the air by the rotation of the wheels of a vehicle in motion contacts the fender. Accordingly, debris can be prevented from contacting other parts of the vehicle in motion, contacting other vehicles located near the vehicle in motion, etc.

DETAILED DESCRIPTION

Fender mounting accessories are described herein. Fender mounting accessories can include a fender bracket and a fender attachment mechanism. A fender bracket can include a bracket body and an extension member including an offset mounting flange for coupling with a fender attachment mechanism. A fender attachment mechanism can include an inner flange for coupling to the fender bracket and attachment locations for coupling to a fender.

Mounting a fender onto a vehicle can be accomplished by various mechanisms. For example, according to some previous approaches, a straight pole may be coupled to a frame of the vehicle, and the pole may be coupled to a fender using different types of hardware fasteners such as threaded rod U-brackets. Another previous approach includes utilizing an offset pole coupled to the frame of the vehicle, where the pole may be coupled to a fender using different types of hardware fasteners. As used herein, the term "fastener" refers to a hardware device that mechanically joins or affixes two or more objects together. Examples of fasteners include a bolt, buckle, button, tie, clamp, clasp, clip, latch, nail, pin, retaining ring, rivet, snap fastener, strap, among other types of fasteners.

Previous approaches to installing a fender can have various drawbacks. For example, a straight pole can have limited mounting locations on the vehicle frame. The limited mounting locations also have to align with a desired fender mounting location, which may not always be the case. An offset pole coupled to the frame of the vehicle may not work with all vehicle frame types, as the shape of the vehicle frame itself and/or various other components coupled to the vehicle frame (e.g., suspension or other components) may interfere with the offset pole, preventing the offset pole from being placed in a particular orientation that aligns with the desired fender mounting location. Further, such previous approaches may not be aesthetically pleasing.

According to one or more embodiments of the disclosure, a fender bracket can allow for a fender to be easily installed or removed from a vehicle frame. The fender bracket can be shaped such that a vehicle frame and/or other components of the vehicle frame do not interfere with orientation of the bracket. Accordingly, the bracket can be oriented in a desired fender mounting location without interference from the vehicle frame and/or components coupled to the vehicle frame. As such, the bracket can work with many vehicle frame designs.

Additionally, according to one or more embodiments of the disclosure, a fender bracket and accessories can be configured such that the fasteners are hidden, which makes the bracket mount and/or the fender more aesthetically pleasing. Additionally, hidden fasteners can prevent contact from debris, as well as assist in preventing corrosion, which can allow for the fender bracket to be easily installed or removed from the vehicle frame.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected and, unless stated otherwise, can include a wireless connection.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

Figure 1:
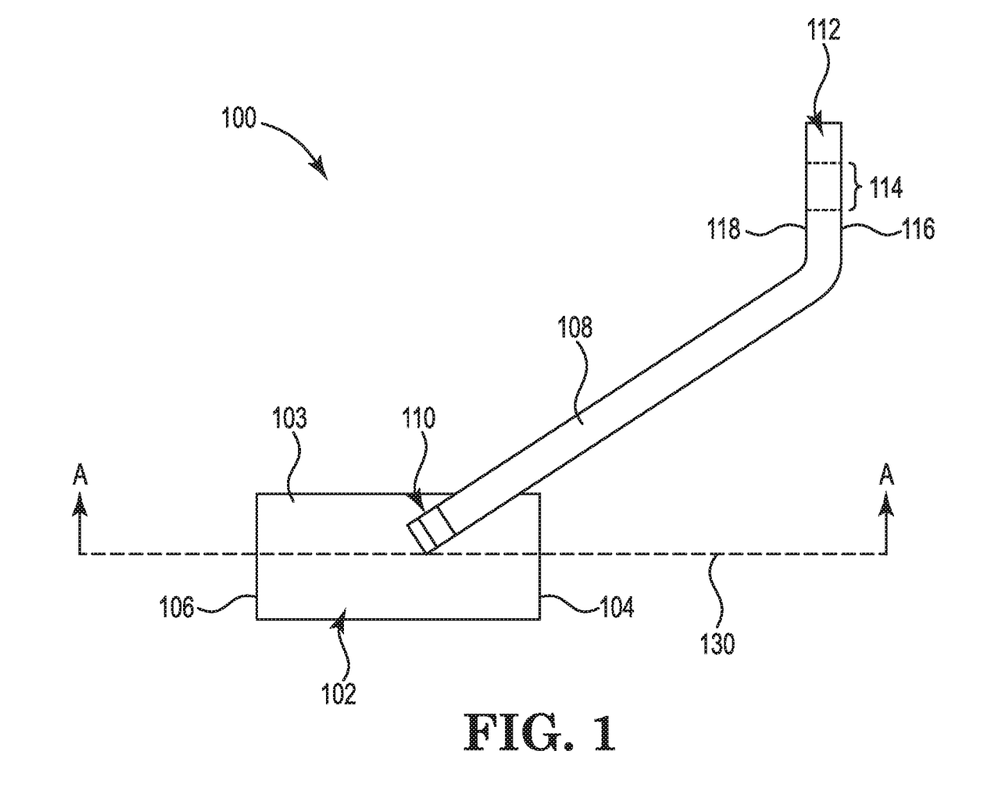
FIG. 1 illustrates a side view of a fender bracket, in accordance with one or more embodiments of the disclosure.

FIG. 1 illustrates a side view of a fender bracket 100, in accordance with one or more embodiments of the disclosure. The fender bracket 100 can be part of a fender bracket offset system. As shown in FIG. 1, the fender bracket 100 includes a bracket body 102 and an extension member 108.

The bracket body 102 can include an outer surface 103 and an inner surface (not illustrated in FIG. 1). Although not illustrated in FIG. 1 for clarity, the inner surface can define an opening in bracket body 102. The inner surface and the opening in bracket body 102 is further described in connection with FIG. 3.

The bracket body 102 can include a frame end surface 106. The frame end surface 106 can be oriented towards a vehicle frame when fender bracket 100 is coupled to a vehicle frame. As used herein, the term "vehicle frame" refers to a main supporting structure of a motor vehicle or trailer. For example, a vehicle frame can be a main supporting structure (e.g., a chassis) to which other components of the motor vehicle are coupled. As described above, the fender bracket 100 can be coupled to the vehicle frame such that a fender can be coupled to the vehicle to prevent debris from being thrown in the air by the wheels of the vehicle. In some examples, frame end surface 106 can be knurled to resist rotation of fender bracket 100 when coupled to a vehicle frame, as is further described in connection with FIGS. 2 and 6.

The bracket body 102 can include a fender end surface 104. The fender end surface 104 can be oriented away from the vehicle frame when fender bracket 100 is coupled to a vehicle frame. The fender end surface 104 is opposite the frame end surface 106.

Although not illustrated in FIG. 1, bracket body 102 can include an inner flange extending from the inner surface of bracket body 102. The inner flange can be spaced from frame end surface 106 of bracket body 102, as is further described in connection with FIG. 3.

The fender bracket 100 can include an extension member 108. As used herein, the term "member" refers to a constituent part of a structural whole. For example, extension member 108 can be a structural member of fender bracket 100. The extension member 108 can include a first end 110 extending from the bracket body 102. In some examples, the extension member 108 can be a continuous extension of material from bracket body 102 (e.g., bracket body 102 and extension member 108 are a unitary body that can be fabricated as a whole). In some examples, the extension member 108 can be coupled to the bracket body 102 (e.g., by welding, soldering, brazing, taping, an adhesive, a fastener, etc.).

The extension member 108 can include an offset mounting flange 112. As used herein, the term "flange" is an external or internal ridge or rim of material to provide a place for attachment of another object. In some examples, the offset mounting flange 112 can be a continuous extension of material from the bracket body 102 (e.g., bracket body 102, extension member 108, and offset mounting flange 112 are a unitary body). In some examples, the extension member 108 can be coupled to the offset mounting flange 112 (e.g., by welding, soldering, brazing, taping, an adhesive, a fastener, etc.).

The offset mounting flange 112 can include an opening 114 therethrough at a second end of extension member 108. The opening 114 is indicated by a dashed line because the opening 114 is not visible in the side view of FIG. 1. The opening 114 can receive a fastener. The fastener can be placed in opening 114 for coupling the offset mounting flange 112 (e.g., coupling the fender bracket 100) with a fender attachment mechanism, as is further described in connection with FIGS. 7 and 8.

The extension member 108 can extend from the bracket body 102 at an angle relative to a longitudinal axis 130 of the bracket body 102. As used herein, the term "longitudinal axis" refers to a lengthwise axis of a body and can be a line about which the body is symmetrical. For example, longitudinal axis 130 can be an axis about which bracket body 102 is symmetrical.

In some examples, the extension member 108 can extend from the bracket body 102 at an angle of 33° relative to the longitudinal axis 130 of the bracket body 102. However, embodiments of the disclosure are not so limited. The extension member 108 can extend from the bracket body 102 at any angle between 0° and 90° relative to the longitudinal axis 130 of the bracket body 102.

The extension member 108 can extend from the bracket body 102 at a particular angle relative to the longitudinal axis 130 of bracket body 102 such that the extension member 108 is oriented away from the frame end surface 106 of the bracket body 102. For example, the extension member 108 can extend "away" from the frame end surface 106 (e.g., and the vehicle frame, when the fender bracket 100 is coupled to the vehicle frame) such that the offset mounting flange 112 and the extension member 108 can clear (e.g., not physically interfere with) any frame components coupled to the vehicle frame and located proximate to the fender bracket 100, as is further described herein.

The extension member 108 is illustrated in FIG. 1 as being a straight member. However, embodiments of the disclosure are not so limited. For example, the extension member 108 can be curved, stepped, etc.

Figure 3:
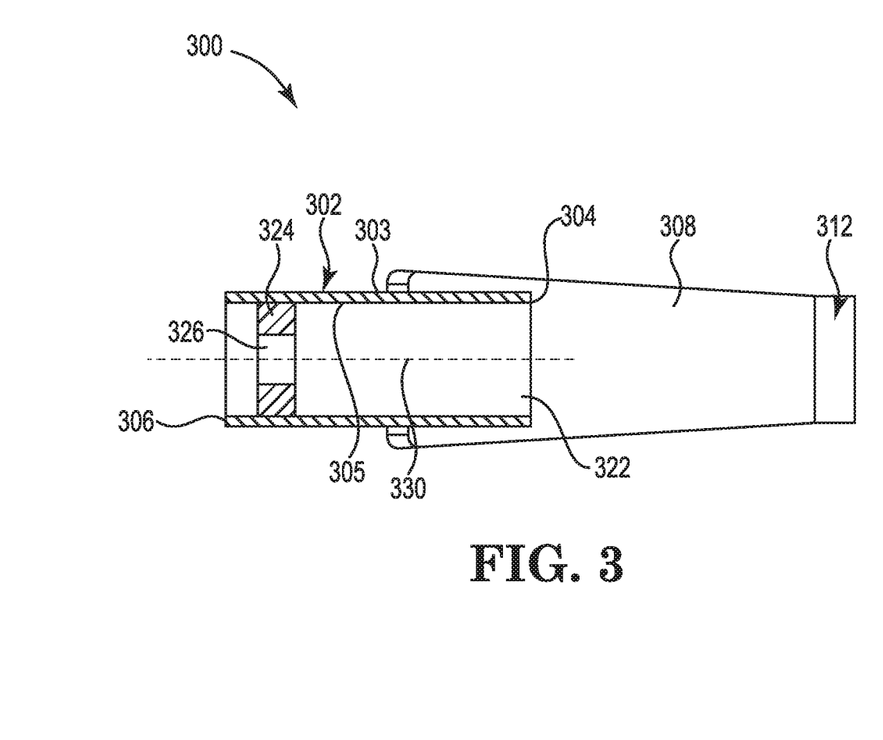
FIG. 3 illustrates a bottom section view of a fender bracket, in accordance with one or more embodiments of the disclosure.

As illustrated in FIG. 1, the fender bracket 100 includes a section line A-A along the longitudinal axis 130. A bottom section view taken along the section line A-A is illustrated in FIG. 3.

In some examples, the width of the offset mounting flange 112 can be a same width as the width of the inner flange (not illustrated in FIG. 1) of the bracket body 102. For example, the width of the offset mounting flange 112 can be 0.5 inches, and the width of the inner flange can be 0.5 inches, although embodiments of the disclosure are not so limited to widths of 0.5 inches. For example, the width of the offset mounting flange 112 can be greater than 0.5 inches or less than 0.5 inches, and the width of the inner flange can correspondingly be greater than 0.5 inches or less than 0.5 inches, respectively. However, in at least one example, the width of the offset mounting flange 112 and the width of the inner flange can be different.

As described above, the fender bracket 100 can be coupled to a vehicle frame such that a fender can be coupled to the vehicle. Accordingly, the fender bracket 100 can be exposed to varying environmental conditions while attached to a vehicle frame of a vehicle. For example, the fender bracket 100 may experience low temperatures, high temperatures, exposure to water, salt, and/or other debris that may be corrosive, impact or strike the fender bracket 100, etc. As such, the fender bracket 100 can be manufactured from a material to allow the use of the fender bracket 100 in varying types of conditions. For example, the fender bracket 100 can be metal, a plastic material, carbon fiber, etc. Further, although the fender bracket 100 is described as being metal, a plastic material, and/or carbon fiber, examples are not so limited. For example, the fender bracket 100 can be another material that can withstand different environmental conditions. In some examples, different components of the fender bracket 100 may be different materials. For example, the bracket body 102 may be metal and the extension member 108 may be carbon fiber. Further, any other combination of components of the fender bracket 100 may be any other combination of materials thereof.

The offset mounting flange 112 can include a frame end face 118. The frame end face 118 can be oriented towards a vehicle frame when the fender bracket 100 is coupled to a vehicle frame.

The offset mounting flange 112 can include an extension member end face 116. The extension member end face 116 can be oriented away from the vehicle frame when the fender bracket 100 is coupled to a vehicle frame. The extension member end face 116 can be opposite the frame end face 118.

As illustrated in FIG. 1, the frame end face 118 of the offset mounting flange 112 can be spaced apart from the fender end surface 104 of the bracket body 102 in a direction parallel to the longitudinal axis 130 of the bracket body 102. For example, the frame end face 118 can be located a particular distance away from the fender end surface 104 of the bracket body 102. Having the frame end face 118 spaced apart from the fender end surface 104 allows for the offset mounting flange 112 and the extension member 108 to be able to clear any frame components attached to the vehicle frame and located proximate to fender bracket 100.

Additionally, as illustrated in FIG. 1, the outer surface 103 of the bracket body 102 can be spaced apart from the offset mounting flange 112. For example, the offset mounting flange 112 can be located a particular distance away from the outer surface 103 of the bracket body 102. Similarly, having the offset mounting flange 112 spaced apart from the outer surface 103 of the bracket body 102 allows for the offset mounting flange 112 and the extension member 108 to be able to clear any frame components attached to the vehicle frame and located proximate to fender bracket 100.

In some examples, the extension member end face 116 and the frame end face 118 of offset mounting flange 112 can be perpendicular to the longitudinal axis 130 of the bracket body 102. For example, the extension member end face 116 and the frame end face 118 of the offset mounting flange 112 can be oriented at right angles relative to the longitudinal axis 130. Having the extension member end face 116 and the frame end face 118 of offset mounting flange 112 perpendicular to the longitudinal axis 130 of the bracket body 102 allows for a fender attachment mechanism to be coupled to the fender bracket in a direction perpendicular to the vehicle frame.

Figure 2:
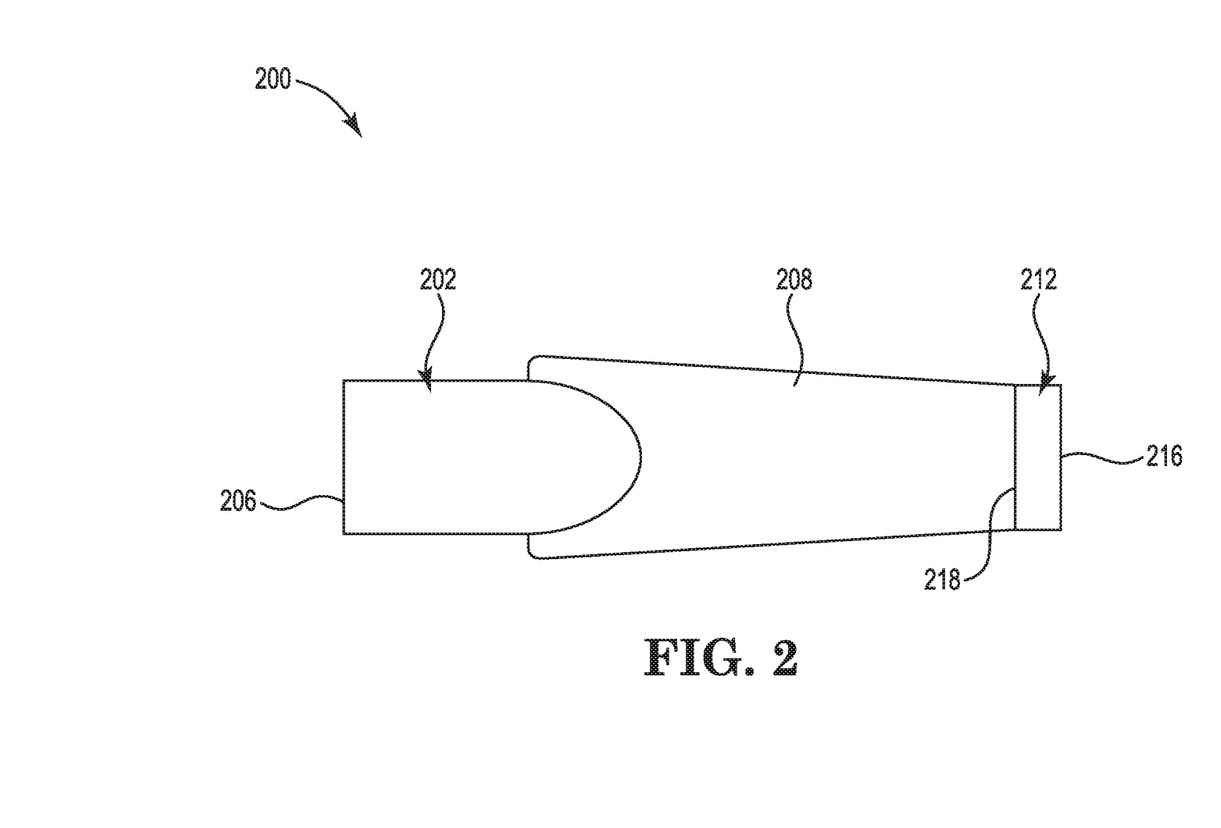
FIG. 2 illustrates a top view of a fender bracket, in accordance with one or more embodiments of the disclosure.

FIG. 2 illustrates a top view of a fender bracket 200, in accordance with one or more embodiments of the disclosure. The fender bracket 200 can be part of a fender bracket offset system. The fender bracket 200 is analogous to the fender bracket 100 illustrated in FIG. 1 and includes a bracket body 202 and an extension member 208.

As previously described in connection with FIG. 1, the fender bracket 200 can include a bracket body 202 and an extension member 208. The extension member 208 can extend from the bracket body 202 and include the offset mounting flange 212. The offset mounting flange 212 can include a frame end face 218 oriented towards a vehicle frame when the fender bracket 200 is coupled to the vehicle frame and the extension member end face 216 oriented away from the vehicle frame when the fender bracket 200 is coupled to the vehicle frame.

The bracket body 202 can include the frame end surface 206. In some examples, the frame end surface 206 can be knurled. As used herein, the term "knurling" refers to a manufacturing process in which a pattern of lines are implemented into a material. For example, the frame end surface 206 can include a pattern of lines in the material of the frame end surface 206. The pattern of lines may include straight patterns, angled patterns, crossed patterns, diamond patterns, etc.

The knurling included on the frame end surface 206 can resist rotation of the fender bracket 200 when coupled to a vehicle frame. For example, the knurled surface of the frame end surface 206 can abut a vehicle frame such that the knurled surface of the frame end surface 206 can engage with the vehicle frame to resist rotation of the fender bracket 200 when coupled to a vehicle frame.

FIG. 3 illustrates a bottom section view of a fender bracket 300, in accordance with one or more embodiments of the disclosure. The bottom section view can be a view taken along a section line A-A previously illustrated in FIG. 1. The fender bracket 300 can be part of a fender bracket offset system. The fender bracket 300 is analogous to the fender bracket 100 illustrated in FIG. 1 and includes a bracket body 302 and an extension member 308.

As previously described in connection with FIGS. 1 and 2, the fender bracket 300 can include a bracket body 302 and an extension member 308. The extension member 308 can extend from the bracket body 302 and include an offset mounting flange 312.

The bracket body 302 can include a frame end surface 306. The frame end surface 306 can be oriented towards a vehicle frame when the fender bracket 300 is coupled to a vehicle frame.

The bracket body 302 can include a fender end surface 304. The fender end surface 304 can be oriented away from the vehicle frame when the fender bracket 300 is coupled to a vehicle frame. To that end, the fender end surface 304 can be opposite the frame end surface 306.

As previously described in connection with FIG. 1, the bracket body 302 can include an outer surface 303 and an inner surface 305. The inner surface 305 can define an opening 322 in the bracket body 302.

The bracket body 302 can further include an inner flange 324. The inner flange 324 can extend from the inner surface 305 of the bracket body opening 322.

As illustrated in FIG. 3, the inner flange 324 can be spaced from the frame end surface 306 of the bracket body 302. That is, the inner flange 324 can be located a particular distance from the frame end surface 306 of the bracket body 302. Accordingly, the inner flange 324 can be proximal to the frame end surface 306 and distal to the fender end surface 304. In some examples, a width of the inner flange 324 can be a same width as the width of the offset mounting flange 312.

The inner flange 324 can include an annulus 326. As used herein, the term "annulus" refers to a ring-shaped part having a space. For example, the annulus 326 can be ring-shaped with a space in the middle of the annulus 326. The annulus 326 can extend from the inner surface 305 of the bracket body 302.

As previously described in connection with FIG. 1, the bracket body 302 can include a longitudinal axis 330. As illustrated in FIG. 3, the longitudinal axis 330 can run through a center of the annulus 326.

The opening 322 of the bracket body 302 can receive a tool (e.g., a socket) or a fastener (e.g. a bolt or a nut) for coupling and/or decoupling the fender bracket 300 with the vehicle frame. For example, the annulus 326 can receive a fastener to couple the fender bracket 300 with the vehicle frame. The opening 322 can be of a shape and/or dimension to receive a tool to tighten and/or loosen the fastener to couple and/or decouple the fender bracket 300 with the vehicle frame.

Figure 4:
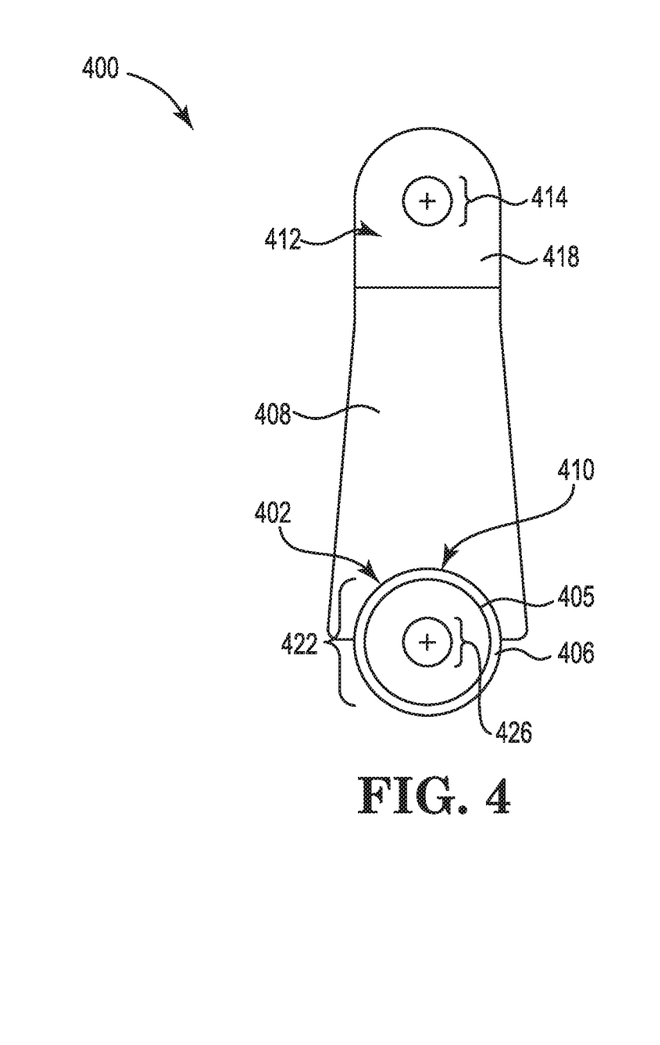
FIG. 4 illustrates a front view of a fender bracket, in accordance with one or more embodiments of the disclosure.

FIG. 4 illustrates a front view of a fender bracket 400, in accordance with one or more embodiments of the disclosure. The fender bracket 400 can be part of a fender bracket offset system. The fender bracket 400 is analogous to the fender bracket 100 illustrated in FIG. 1 and includes a bracket body 402 and an extension member 408.

As previously described in connection with FIGS. 1-3, the fender bracket 400 can include a bracket body 402 and an extension member 408. The bracket body 402 can include a bracket body opening 422. The bracket body 402 can further include an inner flange 424 extending from an inner surface 405 of the bracket body opening 422. The inner flange 424 can include an annulus 426 therethrough.

The extension member 408 can extend from the bracket body 402 and include an offset mounting flange 412. The offset mounting flange 412 can include a frame end face 418 oriented towards a vehicle frame when the fender bracket 400 is coupled to the vehicle frame. The offset mounting flange 412 can include an opening 414 therethrough.

The opening 414 can be an annulus. For example, the extension member 408 can include surfaces defining an opening 414 to be an annulus. The annulus (e.g., opening 414) can receive a fastener for securing the fender bracket 400 to a fender attachment mechanism, as is further described in connection with FIGS. 7 and 8.

As illustrated in FIG. 4, the extension member 408 can include a portion between the first end 410 and the offset mounting flange 412. The portion between the first end 410 and the offset mounting flange 412 can be shaped as a trapezoidal prism. As used herein, the term "trapezoidal prism" refers to a body shaped as a quadrilateral with two parallel sides. For example, a width at the first end 410 of the trapezoidal prism (e.g., the portion between the first end 410 and the offset mounting flange 412) can be greater than a width at the second end (e.g., adjacent to the offset mounting flange 412) of the trapezoidal prism. That is, the width of the trapezoidal prism decreases as the distance from the first end 410 of the trapezoidal prism increases (e.g., towards the offset mounting flange 412).

The offset mounting flange 412 can be shaped as a truncated obround. As used herein, the term "truncated obround" refers to a shortened prism shape including a semicircle having parallel lines tangent to the endpoints of the parallel lines. For example, a first portion of the offset mounting flange 412 can be a semicircle and a second portion of the offset mounting flange 412 can be defined by two parallel lines coupled to the semicircle.

Figure 5:
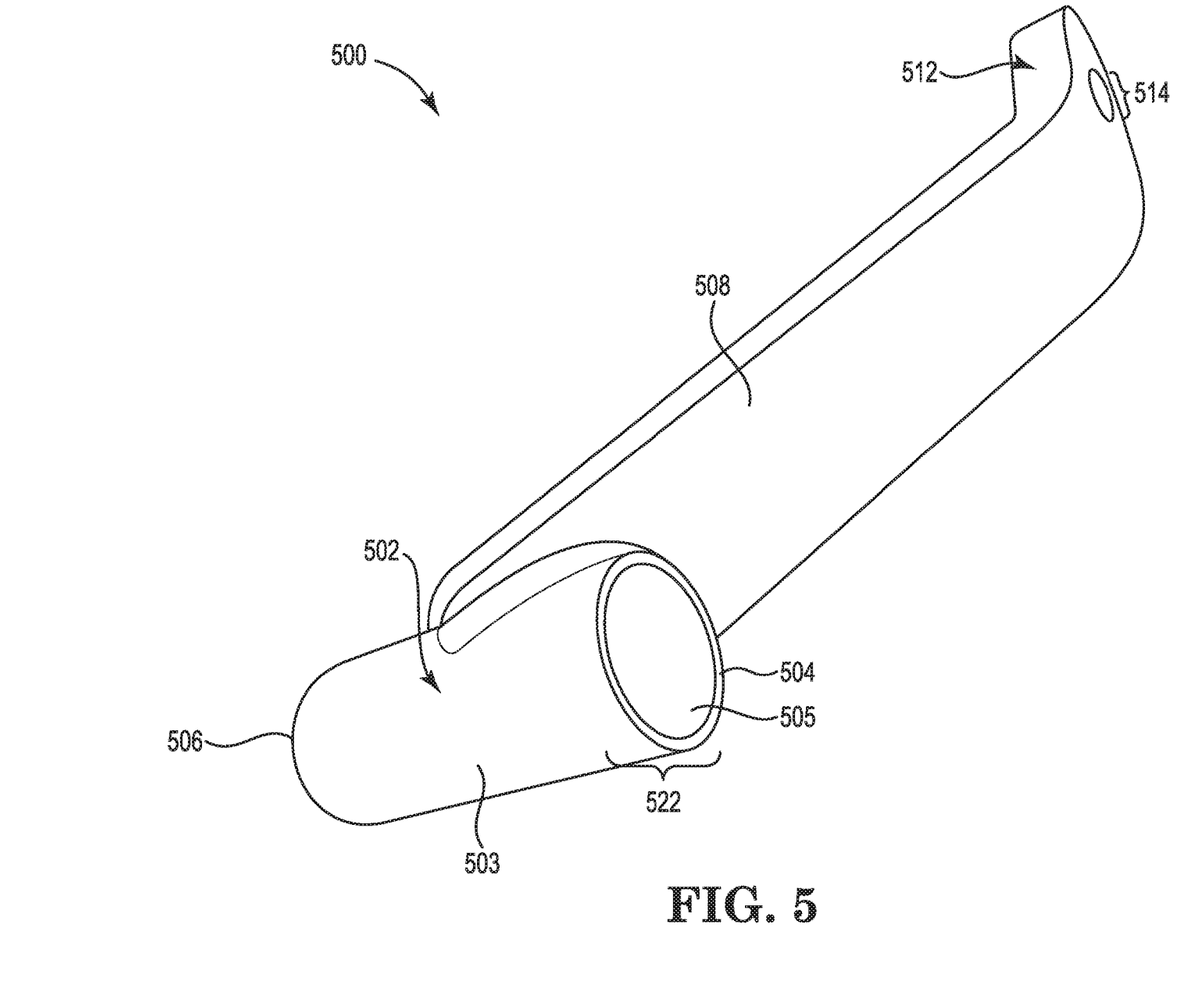
FIG. 5 illustrates a perspective view of a fender bracket, in accordance with one or more embodiments of the disclosure.

FIG. 5 illustrates a perspective view of a fender bracket 500, in accordance with one or more embodiments of the disclosure. The fender bracket 500 can be part of a fender bracket offset system. The fender bracket 500 is analogous to the fender bracket 100 illustrated in FIG. 1 and includes a bracket body 502 and an extension member 508.

As previously described in connection with FIGS. 1-4, the fender bracket 500 can include a bracket body 502 and the extension member 508. The extension member 508 can extend from the bracket body 502 and include the offset mounting flange 512. The offset mounting flange 512 can include an opening 514 therethrough at a second end of the extension member 508.

The bracket body 502 can include an outer surface 503 and an inner surface 505. The inner surface 505 can define an opening 522 in bracket body 502. The opening 522 in bracket body 502 can be defined by the inner surface 505 and be between the outer fender end surface 504 of bracket body 502 and the frame end surface 506 of the bracket body 502, where the inner surface 505 includes an inner flange (e.g., not shown in FIG. 5) extending from the inner surface 505.

As illustrated in FIG. 5, the bracket body 502 can be cylindrically shaped. That is, the bracket body 502 can include a cylindrical (e.g., ringed) cross-section. However, embodiments of the disclosure are not so limited. For example, the bracket body 502 can include a square cross-section, a rectangular cross-section, a triangular cross-section, a squircle cross-section, among other cross-sectional shapes each having an inner surface defining an opening through the differently shaped cross-sections.

Figure 6:
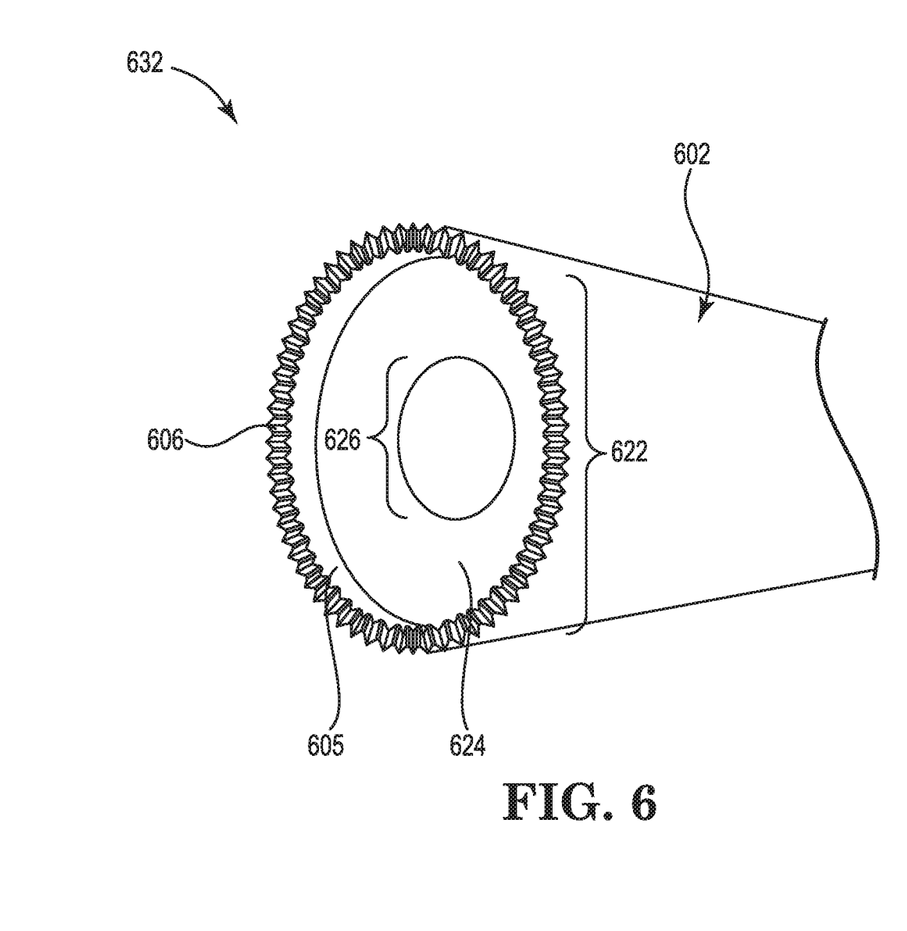
FIG. 6 illustrates a perspective view of a portion of a bracket body of a fender bracket having a knurled edge, in accordance with one or more embodiments of the disclosure.

FIG. 6 illustrates a perspective view of a portion 632 of a bracket body 602 of a fender bracket having a knurled edge, in accordance with one or more embodiments of the disclosure. The bracket body 602 can be a part of a fender bracket, which can be part of a fender bracket offset system. As shown in FIG. 6, the bracket body 602 includes an opening 622, the frame end surface 606 of bracket body 602, and the inner flange 624.

As illustrated in FIG. 6, the inner flange 624 can extend from an inner surface 605 of the bracket body 602. As previously described in connection with FIG. 3, the inner flange 624 can be spaced from the frame end surface 606. The inner flange 624 can include the annulus 626 therethrough.

The frame end surface 606 can be knurled. For example, the frame end surface 606 can include a pattern (e.g., straight, angled, crossed, diamond, etc.) of lines in the material of the frame end surface 606. In some examples, the knurling can be a manufacturing process conducted on, for example, a lathe to remove material from the frame end surface 606 to impart the pattern of lines into the material of the frame end surface 606.

The knurling included on the frame end surface 606 can resist rotation of the bracket body 602 of the fender bracket when the fender bracket is coupled to a vehicle frame. For example, the knurled surface of the frame end surface 606 can abut a vehicle frame such that the knurled surface of the frame end surface 606 can engage with the vehicle frame to resist rotation of the fender bracket when coupled to a vehicle frame.

Figure 7A:
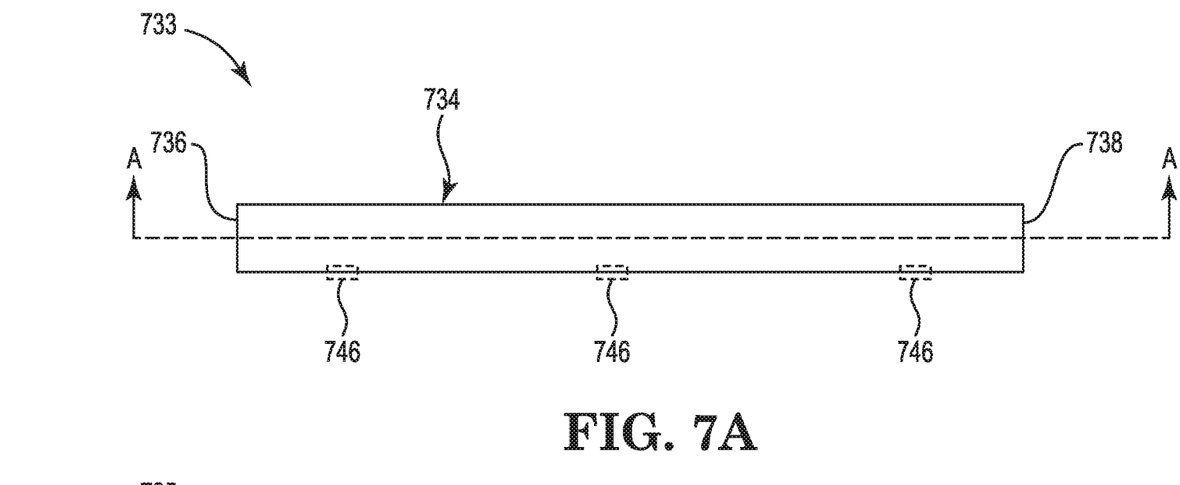
FIG. 7A illustrates a side view of a fender attachment mechanism, in accordance with one or more embodiments of the disclosure.

FIG. 7A illustrates a side view 733 of a fender attachment mechanism 734, in accordance with one or more embodiments of the disclosure. The fender attachment mechanism 734 can be part of a fender bracket offset system. As shown in FIG. 7A, the fender attachment mechanism 734 includes a flange end surface 736 and a fender end surface 738.

The fender attachment mechanism 734 can include a flange end surface 736. The flange end surface 736 can be oriented towards an offset mounting flange of a fender bracket when the fender attachment mechanism 734 is coupled to the fender bracket (e.g., fender bracket 100, previously described in connection with FIG. 1).

The fender attachment mechanism 734 can include a fender end surface 738. The fender end surface 738 can be oriented away from the offset mounting flange of the fender bracket when the fender attachment mechanism 734 is coupled to the fender bracket (e.g., fender bracket 100, previously described in connection with FIG. 1). To that end, the fender end surface 738 can be opposite the flange end surface 736.

As illustrated in FIG. 7A, the fender attachment mechanism 734 includes a section line A-A. A section view taken along the section line A-A is illustrated in FIG. 7B.

Figure 7B:
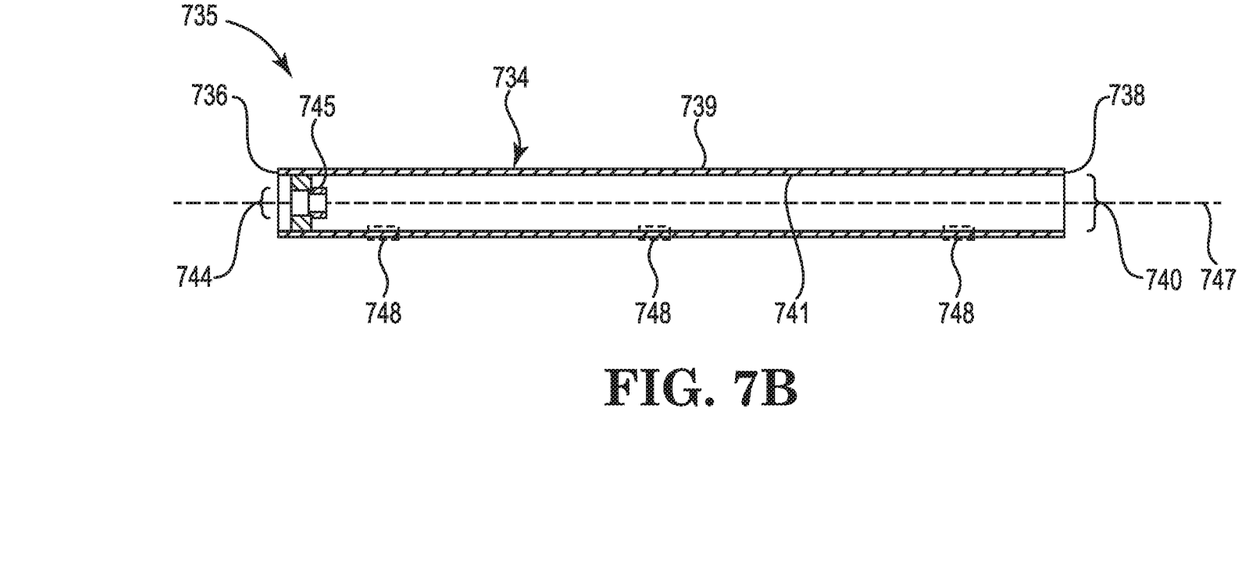
FIG. 7B illustrates a section view of a fender attachment mechanism, in accordance with one or more embodiments of the disclosure.

FIG. 7B illustrates a section view 735 of a fender attachment mechanism 734, in accordance with one or more embodiments of the disclosure. The fender attachment mechanism 734 can be part of a fender bracket offset system. As shown in FIG. 7B, the section view 735 is taken along section line A-A previously illustrated in FIG. 7A.

The fender attachment mechanism 734 can include an outer surface 739 and an inner surface 741. The inner surface 741 of the fender attachment mechanism 734 can define an opening 740 in the fender attachment mechanism 734.

The fender attachment mechanism 734 can include an inner flange 742. The inner flange 742 can extend from the inner surface 741 of the fender attachment mechanism 734.

As illustrated in FIG. 7B, the inner flange 742 can be spaced from the flange end surface 736 of the fender attachment mechanism 734. That is, the inner flange 742 can be located a particular distance from the flange end surface 736 of the fender attachment mechanism 734. Accordingly, the inner flange 742 can be proximal to the flange end surface 736 and distal to the fender end surface 738.

The inner flange 742 can include an annulus 744. For example, the annulus 744 can be ring-shaped with a space in the middle of the annulus 744. The annulus 744 can extend from the inner surface 741 of the fender attachment mechanism 734.

In some examples, the annulus 744 can include threads 745. The threads 745 can allow a fastener to couple a bracket body to the fender attachment mechanism 734, as is further described in connection with FIG. 8. In some examples, the threads 745 can be included on an inner surface of annulus 744. In some examples, the threads 745 can be included on a nut attached to the annulus 744.

As previously described in connection with FIG. 4, an offset mounting flange can include an opening (e.g., opening 414). The opening of the offset mounting flange can receive a fastener to secure the offset mounting flange (e.g., and consequently, the fender bracket) to the fender attachment mechanism 734. A center of the annulus (e.g., opening 414) of the offset mounting flange can be a point on the longitudinal axis 747 of the fender attachment mechanism 734. The fastener, when positioned, can be received through the opening of the offset mounting flange of the fender bracket and through the annulus 744 of the inner flange 742 of the fender attachment mechanism 734.

The fender attachment mechanism 734 can be coupled to a fender. A fender can prevent debris such as sand, mud, rocks, liquids, etc. from being thrown into the air. For instance, a fender can be located proximate to a wheel and/or a set of wheels of a vehicle to act as a barrier such that debris thrown into the air by the rotation of the wheels of a vehicle in motion contacts the fender.

To couple the fender attachment mechanism 734 to a fender, the fender attachment mechanism 734 can include a plurality of attachment locations 746. Each of the plurality of attachment locations 746 can include corresponding fastener connections 748. As used herein, the term "fastener connection" refers to a mechanism with which a fastener couples to another object. For example, the fastener connections 748 can include threaded inserts, threaded bolts, buckles, clips, pins, retaining rings, rivets, anchors, and/or straps, among other types of fastener connections.

The fastener connections 748 can be hidden from view. For example, the fastener connections 748 can oriented in the attachment locations 746 in the fender attachment mechanism 734 such that a top surface of the fastener connections 748 is flush with the outer surface 739 of the fender attachment mechanism 734. The fender attachment mechanism 734 can be oriented when mounting to a fender such that the fastener connections 748 are located adjacent to the fender, and the fastener connections 748 can receive a fastener through a mounting hole in the fender. In other words, the fastener can be inserted through a mounting hole in the fender from a wheel-facing surface of the fender and can be received by one of the fastener connections 748, which are oriented to be adjacent to the non-wheel facing surface of the fender. Since the fastener connections 748 are oriented towards and adjacent to the fender, and the fasteners are inserted through a "bottom" (e.g., the wheel facing side) of the fender, the fastener connections 748 are effectively "hidden" from view, which may allow for an aesthetically pleasing look, as well as assist in preventing corrosion, prevent contact from debris, etc.

Figure 8:
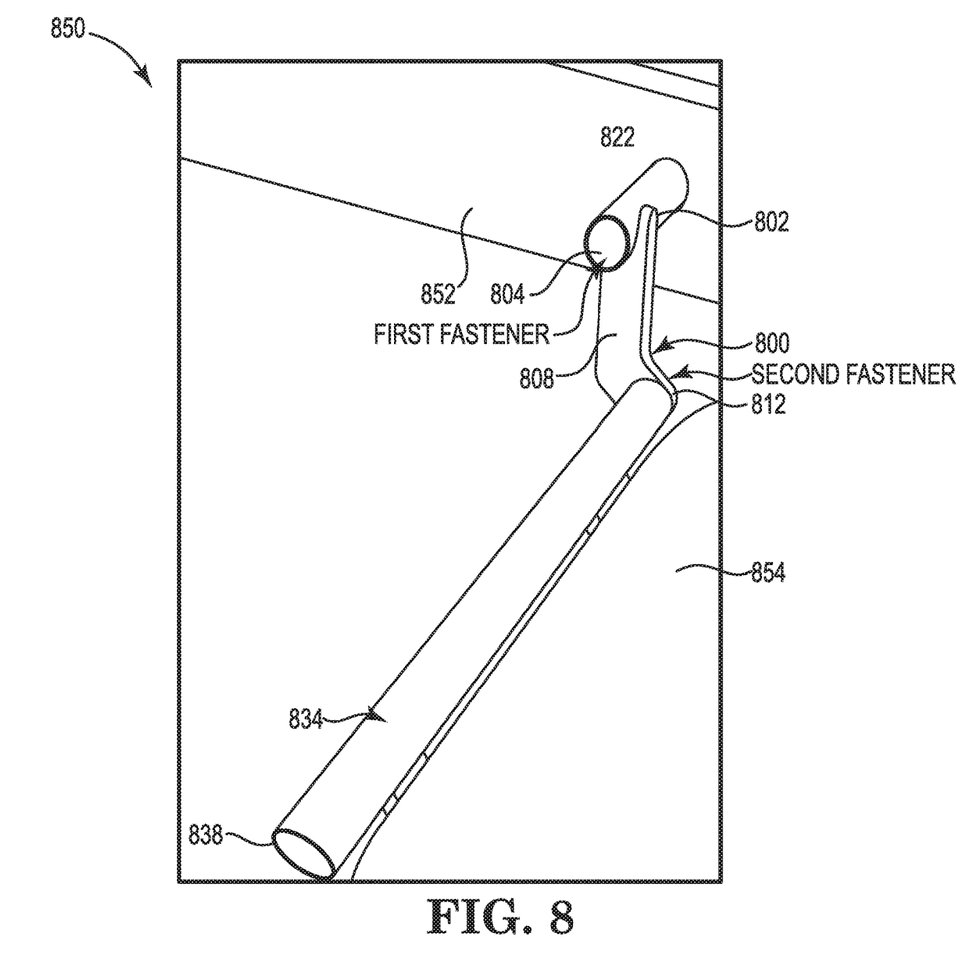
FIG. 8 illustrates a perspective view of a system including a fender bracket coupled to a fender attachment mechanism and a vehicle frame, in accordance with one or more embodiments of the disclosure.

FIG. 8 illustrates a perspective view of a system 850 including a fender bracket 800 coupled to a fender attachment mechanism 834 and a vehicle frame 852, in accordance with one or more embodiments of the disclosure. The fender bracket 800 and the fender attachment mechanism 834 can be part of a fender bracket offset system.

As illustrated in FIG. 8, the system 850 can include a fender bracket 800. As previously described in connection with FIGS. 1-6, the fender bracket 800 can include a bracket body 802 and an extension member 808. The fender bracket 800 can include a frame end surface (not illustrated in FIG. 8) which abuts and is oriented towards the vehicle frame 852 when the fender bracket 800 is coupled to the vehicle frame 852. Additionally, the fender bracket 800 can include a fender end surface 804 which is oriented away from the vehicle frame 852 when the fender bracket 800 is coupled to the vehicle frame 852.

The bracket body 802 can include an outer surface and an inner surface defining an opening 822 in the bracket body 802. As previously described in connection with FIG. 3, the bracket body 802 can include an inner flange comprising an annulus (not illustrated in FIG. 8) extending from the inner surface of bracket body 802. The opening 822 and the annulus of the inner flange of bracket body 802 can receive a first fastener (not illustrated in FIG. 8) in the direction illustrated in FIG. 8 to couple the fender bracket 800 to the vehicle frame 852 which may be adjacent to a suspension or other frame components of the vehicle. The opening 822 can be shaped to receive a tool to tighten and/or loosen the first fastener to couple and/or decouple the bracket body 802 to vehicle frame 852, respectively.

Fender bracket 800 can include an extension member 808 having an offset mounting flange 812. the offset mounting flange 812 can include an opening (not illustrated in FIG. 8) which can be an annulus. The opening can receive a second fastener inserted in the direction illustrated in FIG. 8 from the frame end face (e.g., frame end face 118, previously described in connection with FIG. 1) of the offset mounting flange 812.

As previously described in connection with FIG. 7B, the fender attachment mechanism 834 can include a flange end surface (e.g., flange end surface 736) located proximate to an extension member end face (e.g., extension member end face 116) of the offset mounting flange 812 when the fender attachment mechanism 834 is coupled to the fender bracket 800.

Although not illustrated in FIG. 8, the fender attachment mechanism 834 can include an inner flange (e.g., inner flange 742 previously described in connection with FIG. 7B) located proximal to the flange end surface of the fender attachment mechanism 834. The inner flange of the fender attachment mechanism 834 can receive the second fastener inserted from the frame end face of the offset mounting flange 812 to couple the fender attachment mechanism 834 to the bracket body 802.

Although not illustrated in FIG. 8 for clarity, the outer surface of fender attachment mechanism 834 can include a plurality of attachment locations each having a fastener connection. As previously described in connection with FIG. 7, the fastener connections can be hidden from view. Hiding the fastener connections can prevent the fastener connections from being exposed to environmental conditions to prevent damage from corrosion, impact from debris, etc. Further, hiding the fastener connections can provide an aesthetically pleasing look.

The fender attachment mechanism 834 can be coupled to the fender 854 via each fastener connection of the plurality of attachment locations. For example, the fastener connections can receive fasteners from "below" the fender 854 to couple the fender attachment mechanism 834 to the fender 854.

The longitudinal axis (e.g., longitudinal axis 747, previously described in connection with FIG. 7B) of the fender attachment mechanism 834 can be parallel to a longitudinal axis (e.g., longitudinal axis 130, previously described in connection with FIG. 1) of the bracket body. For example, when coupled, the longitudinal axes of the fender attachment mechanism 834 and the bracket body 802 can be parallel.

The extension member 808 of the fender bracket 800 can be shaped to provide clearance around components on the vehicle frame 852 such that the fender attachment mechanism 834 can be coupled to the fender 854 and to the extension member 808 while the fender bracket 800 is coupled to the vehicle frame 852. For example, while coupling or decoupling the fender bracket offset system, a user (e.g., a mechanic, driver, etc.) can rotate the fender bracket 800 prior to tightening the first fastener (e.g., located in the bracket body opening 822) in order to orient the fender bracket 800 to a position at which the fender attachment mechanism 834 can couple to the fender 854. Accordingly, shaping the extension member 808 can allow fender bracket 800 to work on many types of vehicle frames.

The extension member 808 can be shaped to provide clearance around components on the vehicle frame 852 such that the fender attachment mechanism 834 can be decoupled from the fender bracket 800 or from the fender 854 while the fender bracket 800 is coupled to the vehicle frame 852. Additionally, prior to tightening the second fastener (e.g., located in the opening of the offset mounting flange 812 and an annulus of the inner flange of the fender attachment mechanism 834), a user can rotate the fender attachment mechanism 834 prior to tightening the second fastener in order to orient the fastener connections to a position at which the fender attachment mechanism 834 can couple to the fender 854.

Figure 9:
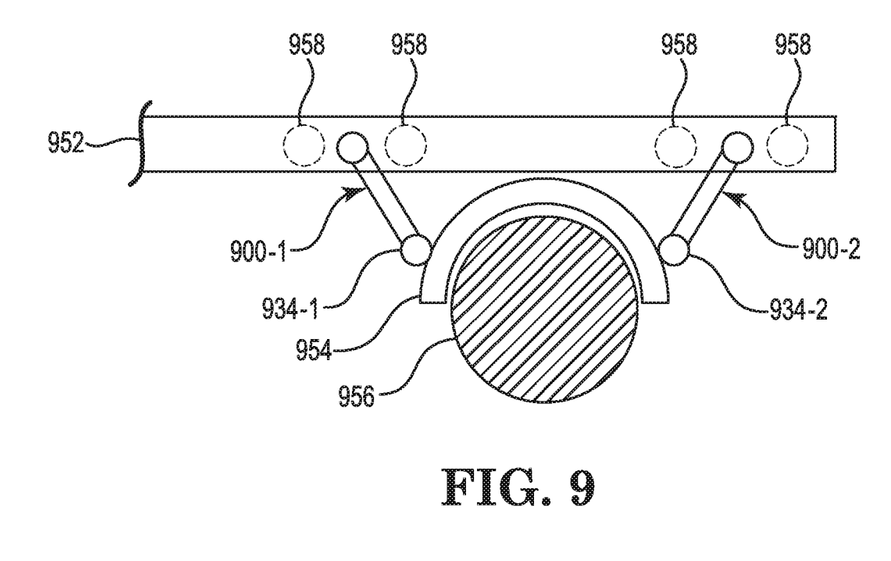
FIG. 9 illustrates a side view of a portion of a vehicle frame including a fender bracket offset system, in accordance with one or more embodiments of the disclosure.

FIG. 9 illustrates a side view of a portion of a vehicle frame 952 including a fender bracket offset system, in accordance with one or more embodiments of the disclosure. As illustrated in FIG. 9, the fender bracket offset system can include a first fender bracket 900-1 connected to an extension mechanism 934-1 and a second fender bracket 900-2 connected to an extension mechanism 934-2.

As illustrated in FIG. 9, a portion of the vehicle frame 952 is shown. Although not illustrated in FIG. 9, the wheel 956 can be connected to the vehicle frame 952 via suspension components. As previously described above, when the vehicle 952 is in motion, the wheel 956 may cause debris to be thrown into the air due to the rotation of the wheel 956. Accordingly, the fender 954 can be coupled to the vehicle frame 952 to prevent the debris from being thrown in the air.

As previously described in connection with FIGS. 1-8, the fender 954 can be coupled to the vehicle frame 952 utilizing the fender brackets 900-1, 900-2 connected to the fender attachment mechanisms 934-1, 934-2, respectively.

For example, the fender bracket offset system can utilize the two fender brackets 900-1 and 900-2 and the two fender attachment mechanisms 934-1, 934-2 to couple the fender 954 to the vehicle frame 952. The first fender bracket 900-1 can include a bracket body connected to the vehicle frame 952. The bracket body can include an extension member having an offset mounting flange (e.g., not illustrated in FIG. 9), where the offset mounting flange can be coupled to the fender attachment mechanism 934-1. The fender attachment mechanism 934-1 can couple to the fender 954 utilizing hidden fasteners included in the fender attachment mechanism 934-1. Additionally, the second fender bracket 900-2 can include the bracket body connected to the vehicle frame 952. The bracket body can include an extension member having an offset mounting flange (e.g., not illustrated in FIG. 9), where the offset mounting flange can be coupled to the fender attachment mechanism 934-2. The fender attachment mechanism 934-2 can couple to the fender 954 utilizing hidden fasteners included in the fender attachment mechanism 934-2.

The fender 954 can be coupled to the vehicle frame 952 utilizing the two fender brackets 900-1 and 900-2 and the two fender attachment mechanisms 934-1 and 934-2. However, embodiments of the disclosure are not so limited. For example, the fender 952 can be coupled to the vehicle frame 952 utilizing one fender bracket and one fender attachment mechanism or more than two fender brackets and fender attachment mechanisms.

The fender 954 can be a single axle fender. For example, as illustrated in FIG. 9, the fender 954 can be a fender covering a single wheel 956. However, embodiments of the disclosure are not so limited. For example, the fender 954 can be a full tandem fender (e.g., a single fender that covers two wheels on tandem axles), a half tandem fender (e.g., a single fender that partially covers two wheels on tandem axles), a half fender (e.g., a single fender that partially covers one wheel on a single axle), a quarter fender (e.g., a single fender having partial coverage of one wheel that is less than the partial coverage of a half fender), etc.

The vehicle frame 952 can include other available mounting locations 958. The other available mounting locations 958 can be preexisting holes in the vehicle frame 952. For example, the fender bracket 900-1 can be mounted in one of the other available mounting locations 958 based on the type of the fender 954, the shape and/or dimensions of the fender 954, the existence of other vehicle and/or suspension components located proximate to the fender brackets 900-1/900-2 and/or the fender attachment mechanisms 934-1/934-2, among other considerations. Utilizing the preexisting holes in the vehicle frame 952 can prevent an installer from having to drill or otherwise create new mounting locations on the vehicle frame 952, which can prevent structural issues from being introduced to the vehicle frame 952.

Figure 10:
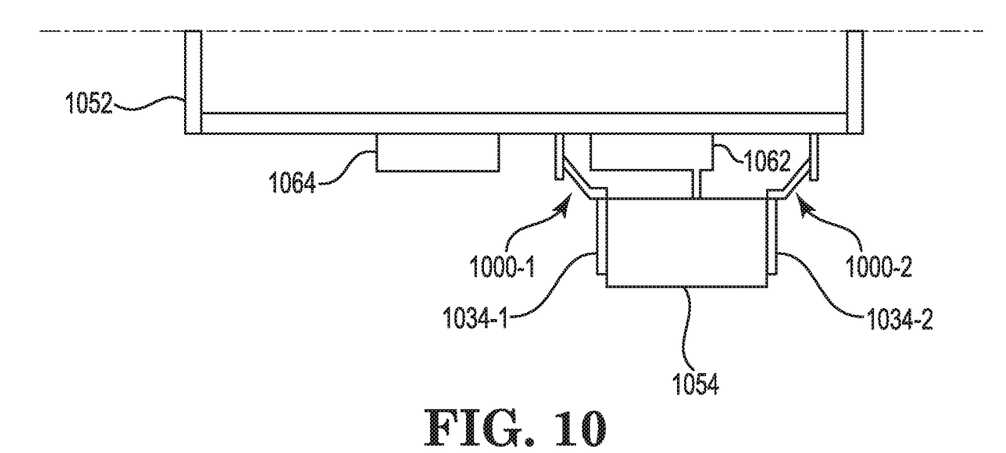
FIG. 10 illustrates a top view of a portion of a vehicle frame including a fender bracket offset system, in accordance with one or more embodiments of the disclosure.

FIG. 10 illustrates a top view of a portion of a vehicle frame 1052 including a fender bracket offset system, in accordance with one or more embodiments of the disclosure. As illustrated in FIG. 10, the fender bracket offset system can include a first fender bracket 1000-1 connected to an extension mechanism 1034-1 and a second fender bracket 1000-2 connected to an extension mechanism 1034-2.

As illustrated in FIG. 10, a portion of the vehicle frame 1052 is shown. The suspension component 1062 can connect a wheel (e.g., not illustrated in FIG. 10) to the vehicle frame 1052. As used herein, the term "suspension component" refers to a component that connects a vehicle to its wheel and allows free relative motion between the vehicle and the wheel. For example, suspension component 1062 can include a spring, shock absorber, and/or linkage, among other suspension components.

As previously described above, when the vehicle 1052 is in motion, the wheel may cause debris to be thrown into the air due to the rotation of the wheel. Accordingly, the fender 1054 can be coupled to the vehicle frame 1052 to prevent the debris from being thrown in the air. For example, the fender 1054 can be located "above" the wheel to act as a barrier to prevent debris from being thrown in the air.

As previously described in connection with FIGS. 1-9, the fender 1054 can be coupled to the vehicle frame 1052 utilizing the fender brackets 1000-1, 1000-2 connected to the fender attachment mechanisms 1034-1, 1034-2, respectively.

For example, the fender bracket offset system can utilize the two fender brackets 1000-1 and 1000-2 and the two fender attachment mechanisms 1034-1, 1034-2 to couple the fender 1054 to the vehicle frame 1052. The first fender bracket 1000-1 can include a bracket body connected to the vehicle frame 1052. The bracket body can include an extension member having an offset mounting flange coupled to the fender attachment mechanism 1034-1. The fender attachment mechanism 1034-1 can couple to the fender 1054 utilizing hidden fasteners included in the fender attachment mechanism 1034-1. Additionally, the second fender bracket 1000-2 can include the bracket body connected to the vehicle frame 952. The bracket body can include an extension member having an offset mounting flange coupled to the fender attachment mechanism 1034-2. The fender attachment mechanism 1034-2 can couple to the fender 1054 utilizing hidden fasteners included in the fender attachment mechanism 1034-2.

The extension member of the fender bracket 1000-1 can be shaped to provide clearance around the suspension component 1062. For example, the fender bracket 1000-1 can include an extension member shaped such that when installed (e.g., as illustrated in FIG. 10), the extension member can clear (e.g., not physically interfere with) the suspension component 1062. The extension member clearing the suspension component 1062 can allow a user installing the fender bracket 1000-1 to rotate the fender bracket to orient the fender bracket 1000-1 to a position at which the fender attachment mechanism 1034-1 can couple to the fender 1054.

Although the extension member of the fender bracket 1000-1 is described above as being shaped to provide clearance around the suspension component 1062, embodiments of the disclosure are not so limited. For example, the extension member of the fender bracket 1000-1 can be shaped to provide clearance around the frame component 1064 (e.g., a fuel tank, or other frame component). Additionally, the extension member of the fender bracket 1000-2 can be shaped to provide clearance around the suspension component 1062, the frame component 1062, and/or any other component coupled to the vehicle frame 1052.

A fender bracket offset system, in accordance with the disclosure, can be used to mount a fender on a vehicle frame. The fender bracket offset system can include a fender bracket shaped to provide clearance around components coupled to a vehicle frame such as suspension components, fuel tanks, storage compartments, etc. Shaping the fender bracket as such can allow the fender bracket to utilize preexisting holes in the vehicle frame to prevent drilling of new mounting holes, which may cause structural issues with the vehicle frame and require additional time and expense. Further, the fender bracket shape can allow the fender bracket to be utilized with a variety of different suspension and/or frame configurations on different vehicle frames.

In addition, the fender bracket can be shaped such that the fender attachment mechanism can be coupled to the fender and to the extension member while the fender bracket is coupled to the vehicle frame. Further, the extension member can be shaped such that the fender attachment mechanism can be decoupled from the fender and/or from the fender bracket while the fender bracket is coupled to the vehicle frame. Such shapes can allow for easy installation and/or removal of the fender bracket offset system.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A fender bracket, comprising:
   a bracket body having an outer surface and an inner surface, the inner surface defining an opening in the bracket body, the bracket body further including:
      a frame end surface;
      a fender end surface opposite the frame end surface; and
      an inner flange extending from the inner surface and spaced from the frame end surface of the bracket body; and
   an extension member, including:
      a first end extending from the bracket body; and
      an offset mounting flange having an opening therethrough at a second end of the extension member for coupling with a fender attachment mechanism.

2. The fender bracket of claim 1, wherein the extension member extends from the bracket body at an angle relative to a longitudinal axis of the bracket body such that the extension member is oriented away from the frame end surface of the bracket body.

3. The fender bracket of claim 2, wherein the offset mounting flange includes an extension member end face and a frame end face;
   wherein the frame end face is spaced apart from the fender end surface of the bracket body in a direction parallel to the longitudinal axis of the bracket body; and
   wherein the outer surface of the bracket body is spaced apart from the offset mounting flange.

4. The fender bracket of claim 1, wherein:
   the offset mounting flange includes an extension member end face and a frame end face; and
   the extension member end face and the frame end face are perpendicular to a longitudinal axis of the bracket body.

5. The fender bracket of claim 1, wherein the frame end surface of the bracket body is knurled to resist rotation when coupled to a vehicle frame.

6. The fender bracket of claim 1, wherein the inner flange comprises an annulus extending from the inner surface of the bracket body; and
   a longitudinal axis of the bracket body runs through a center of the annulus.

7. The fender bracket of claim 1, wherein the inner flange is proximal to the frame end surface and distal to the fender end surface.

8. The fender bracket of claim 1, wherein a width of the offset mounting flange is a same width as a width of the inner flange of the bracket body.

9. The fender bracket of claim 1, wherein the extension member includes a portion between the first end and the offset mounting flange shaped as a trapezoidal prism; and wherein the offset mounting flange of the extension member is shaped as a truncated obround.

10. A fender bracket offset system, comprising:
    a fender bracket comprising a bracket body and an extension member, wherein the bracket body is coupled to a vehicle frame adjacent to a suspension of the vehicle; and
    a fender attachment mechanism coupled to the extension member and to a fender;
    wherein the extension member of the fender bracket is shaped to provide clearance around the suspension for the fender attachment mechanism to be coupled to the fender and to the extension member while the fender bracket is coupled to the vehicle frame.

11. The system of claim 10, wherein the extension member is shaped to provide clearance around the suspension for the fender attachment mechanism to be decoupled from the fender or from the fender bracket while the fender bracket is coupled to the vehicle frame.

12. The system of claim 10, wherein the bracket body includes an outer surface and an inner surface, the inner surface defining an opening in the bracket body configured to receive a tool or a fastener for coupling and decoupling the fender bracket offset system with the vehicle frame.

13. The system of claim 12, wherein the extension member includes surfaces defining an annulus therethrough configured to receive a fastener for securing the fender attachment mechanism to the extension member;
    wherein a center of the annulus is a point on a longitudinal axis of the fender attachment mechanism; and
    wherein the longitudinal axis of the fender attachment mechanism is parallel to a longitudinal axis of the bracket body.

14. A fender bracket offset system, comprising:
    a fender bracket comprising:
       a bracket body having an outer surface and an inner surface, the inner surface defining an opening in the bracket body, the bracket body further including:
          a frame end surface oriented towards a vehicle frame when the fender bracket is coupled to the vehicle frame;
          a fender end surface opposite the frame end surface and oriented away from the vehicle frame when the fender bracket is coupled to the vehicle frame; and
          an inner flange comprising an annulus extending from the inner surface of the bracket body to receive a first fastener to couple the fender bracket to the vehicle frame; and
       an extension member extending from the bracket body at angle relative to a longitudinal axis of the bracket body such that the extension member is oriented away from the frame end surface of the bracket body, wherein the extension member includes:
          a first end extending from the bracket body; and
          an offset mounting flange having an opening therethrough at a second end of the extension member for coupling with a fender attachment mechanism; and
    a fender attachment mechanism to be coupled to a fender, the fender attachment mechanism having an outer surface and an inner surface.

15. The system of claim 14, wherein the offset mounting flange includes a frame end face and an extension member end face such that:

the frame end face of the offset mounting flange is oriented towards the vehicle frame when the fender bracket is coupled to the vehicle frame; and the extension member end face of the offset mounting flange is oriented away from the vehicle frame when the fender bracket is coupled to the vehicle frame.

16. The system of claim 14, wherein the inner surface of the fender attachment mechanism defines an opening in the fender attachment mechanism, the fender attachment mechanism further including:

a flange end surface of the fender attachment mechanism;

a fender end surface of the fender attachment mechanism; and an inner flange extending from the inner surface of the fender attachment mechanism and spaced from the flange end surface of the fender attachment mechanism.

17. The system of claim 16, the offset mounting flange having an opening therethrough to receive a second fastener such that the second fastener couples the bracket body to the fender attachment mechanism.

18. The system of claim 17, wherein the inner flange comprises an annulus extending from the inner surface of the fender attachment mechanism, the annulus including threads for the second fastener to couple the bracket body to the fender attachment mechanism.

19. The system of claim 14, wherein the outer surface of the fender attachment mechanism includes a plurality of attachment locations each having a fastener connection.

20. The system of claim 19, wherein the fender attachment mechanism is configured to couple to a fender of the vehicle via each fastener connection of the plurality of attachment locations.

* * * * *